United States Patent
Shah et al.

(10) Patent No.: US 11,288,109 B2
(45) Date of Patent: Mar. 29, 2022

(54) DETERMINATION OF TIMEOUT VALUE OF AN APPLICATION SERVICE IN A MICROSERVICE ARCHITECTURE

(71) Applicant: International Business Machines Corporation, Armonk, NY (US)

(72) Inventors: Amar Shah, Pune (IN); Sowmya S. Grama, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 50 days.

(21) Appl. No.: 16/898,910

(22) Filed: Jun. 11, 2020

(65) Prior Publication Data

US 2021/0390002 A1  Dec. 16, 2021

(51) Int. Cl.
  *G06F 9/54* (2006.01)
  *G06F 9/46* (2006.01)
(52) U.S. Cl.
  CPC .............. *G06F 9/546* (2013.01); *G06F 9/466* (2013.01)
(58) Field of Classification Search
  None
  See application file for complete search history.

(56) References Cited

U.S. PATENT DOCUMENTS

| | | | |
|---|---|---|---|
| 6,526,433 B1 | 2/2003 | Chang et al. | |
| 8,966,487 B1 | 2/2015 | Leonard | |
| 10,263,876 B2 | 4/2019 | Kraev | |
| 2013/0311622 A1* | 11/2013 | Gupta | |
| 2014/0082403 A1* | 3/2014 | Kraev | |
| 2017/0147394 A1 | 5/2017 | Bates et al. | |
| 2020/0036798 A1* | 1/2020 | Dierckens | |
| 2020/0120000 A1* | 4/2020 | Parthasarathy | |

FOREIGN PATENT DOCUMENTS

CN  106528301 A  3/2017

OTHER PUBLICATIONS

Xinhua et al. "Dynamic timeout-based a session identification algorithm"; 2011 International Conference on Electric Information and Control Engineering; Apr. 2011.

(Continued)

*Primary Examiner* — Syed A Roni
(74) *Attorney, Agent, or Firm* — Haley J. McClory

(57) ABSTRACT

A processor may determine a microservice invocation hierarchy based on transaction data of a plurality of microservices of the microservice architecture. For execution of the application, a processor may configure the microservice architecture to call on common service having common service timeout values. A processor may plot transaction data of the microservice invocation hierarchy to identify an increase in average timeout value trend of each of the microservices of the at least one application over time. A processor may determine a value of the identified increase in a timeout ratio to be added to common service timeout value for each identified increase in the average timeout value trend in which an increase in timeout variation is present. A processor may implement a dynamic adjustment timeout value based on the identified increase in the timeout ratio to be added to common service timeout value of all called microservices of the application.

17 Claims, 8 Drawing Sheets

(56) References Cited

OTHER PUBLICATIONS

Plank et al. "The Effect of Timeout Prediction and Selection on Wide Area Collective Operations"; Proceedings IEEE International Symposium on Network Computing and Applications. NCA 2001; Oct. 2001.

Kim et al. "A Dynamic Timeout Control Algorithm in Software Defined Networks"; International Journal of Future Computer and Communication, vol. 3, No. 5, Oct. 2014.

\* cited by examiner

DETERMINATION OF TIMEOUT VALUE OF AN APPLICATION SERVICE IN A MICROSERVICE ARCHITECTURE

BACKGROUND

The present invention relates to application services, and more specifically to determination of a timeout value of an application service.

In a distributed hybrid computing environment, a transaction initiated by an application may be comprised of a series of invocations to various services running in a cloud environment as well as in an on-premises system that acts on a backend system of records. Each of the services that is invoked along a path to execute the transaction can have its own timeout value. The timeout value is an amount of time, in seconds, to wait between successive attempts of an operation to complete. The invoking applications have a fixed timeout value, such that if the initiated operation or associated transactions do not complete within a fixed time, the calling application would terminate the transaction and takes the next request.

In an asynchronous messaging transaction system, where the client application has timed out, but the transaction may still be running as a remote service or on-premises, determining if the transaction has actually failed or is just slow is difficult to determine. When the application is making downstream requests, the overall outcome of the transaction depends on the timeout value set for the application itself and timeout values of each of the services that make up the transaction.

If client application's timeout value is 3 seconds and the highest value in the downstream services is 5 seconds, the client application can time out even though downstream services completed within the designated timeout value. Such situations can cause ambiguity to the end user and the end user may end up retrying the transaction, which can result in duplication, an undesirable outcome, as well as unnecessary usage of computer or cloud environment resources.

Conventionally, when multiple services have different timeouts values are involved to execute a transaction, the client application timeout value is set to always be higher than that of a service in the transaction that has the longest timeout value in the entire chain of the transaction. However, an application developer may not always know the timeout values of each of the services of the client user, as the client user can be using interfaces provided to invoke a service and that service may internally invoke a series of services which could be running in the cloud environment or on-premises. Furthermore, it is impractical to set a high timeout value, as the high timeout value provides an undesired user experience, as well as holding a connection too long can cripple the system and devoid the system of processing other transactions.

Alternatively, a service may be used by multiple applications such as a logging service and an error handling service. Each of these applications may be having their own timeout values.

SUMMARY

According to one embodiment of the present invention, a method of determining a timeout value of at least one application having a microservice architecture. The method comprising the steps of: determining a microservice invocation hierarchy based on transaction data of a plurality of microservices of the microservice architecture, for execution of the at least one application, the microservice architecture configured to call on a common service having a common service timeout value; plotting the transaction data of the microservice invocation hierarchy to identify an increase in average timeout value trend of each of the microservices of the at least one application over time; for each identified increase in the average timeout value trend in which an increase in timeout variation is present, determining a value of the identified increase in a timeout ratio to be added to the common service timeout value; and implementing a dynamic adjustment timeout value based on the identified increase in the timeout ratio to be added to the common service timeout value of all called microservices of the at least one application.

According to another embodiment of the present invention, a computer program product for determining a timeout value of at least one application having a microservice architecture of a plurality of microservices which calls on a common service having a common service timeout value is disclosed. The microservice architecture comprising at least one processor, one or more memories, one or more computer readable storage media, the computer program product comprising a computer readable storage medium having program instructions embodied therewith. The program instructions executable by the common service to perform a method comprising: determining, by a common service of the microservice architecture, a microservice invocation hierarchy based on transaction data of the plurality of microservices of the microservice architecture for execution of the at least one application, the microservice architecture configured to call on the common service having a common service timeout value; plotting, by the common service, the transaction data of the microservice invocation hierarchy to identify an increase in average timeout value trend of each of the microservices of the at least one application over time; for each identified increase in the average timeout value trend in which an increase in timeout variation is present, determining, by the common service, a value of the identified increase in a timeout ratio to be added to the common service timeout value; and implementing, by the common service, a dynamic adjustment timeout value based on the identified increase in the timeout ratio to be added to the common service timeout value of all called microservices of the at least one application.

According to another embodiment of the present invention, a computer system for determining a timeout value of at least one application having a microservice architecture of a plurality of microservices which calls on a common service having a common service timeout value is disclosed. The computer system comprising at least one processor; one or more memories; and one or more computer readable storage media having program instructions executable by the computer system to perform the program instructions. The program instructions comprising: determining, by a common service of the microservice architecture, a microservice invocation hierarchy based on transaction data of the plurality of microservices of the microservice architecture for execution of the at least one application, the microservice architecture configured to call on the common service having a common service timeout value; plotting, by the common service, the transaction data of the microservice invocation hierarchy to identify an increase in average timeout value trend of each of the microservices of the at least one application over time; for each identified increase in the average timeout value trend in which an increase in timeout variation is present, determining, by the common service, a value of the identified increase in a timeout ratio to be added to the common service timeout value; and implementing, by the common service, a dynamic adjustment timeout value based on the identified increase in the timeout ratio to be added to the common service timeout value of all called microservices of the at least one application.

DETAILED DESCRIPTION

Figure 1:
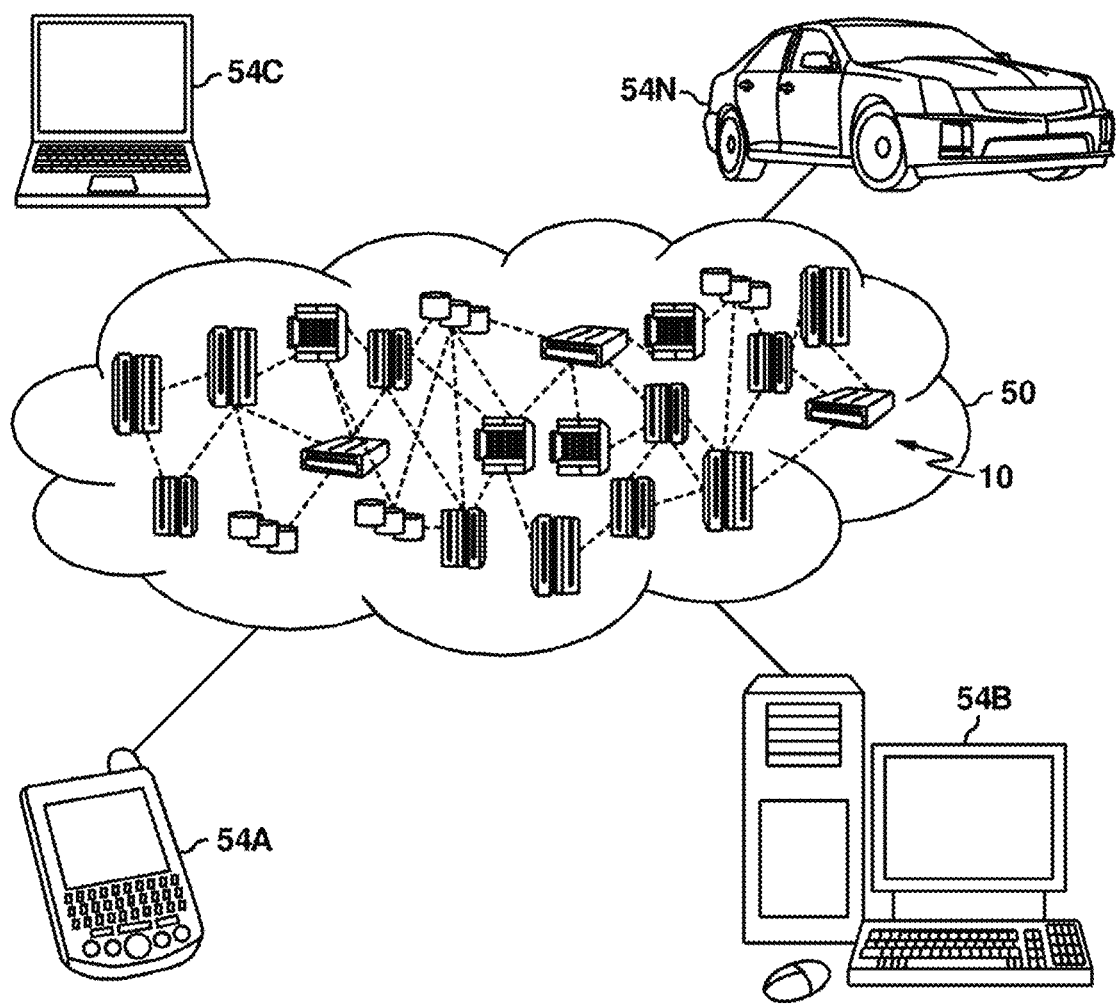
FIG. 1 depicts a cloud computing environment according to an embodiment of the present invention.

It will be recognized that in embodiments of the present invention, the method, computer program product and computer system provide a more robust or fault tolerant system which dynamically adjusts the timeout values of a client application so that the transaction outcomes are more reliable, thus increasing the efficiency of the operation of the system as well usage of resources by the system.

It is to be understood that although this disclosure includes a detailed description of cloud computing, the implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
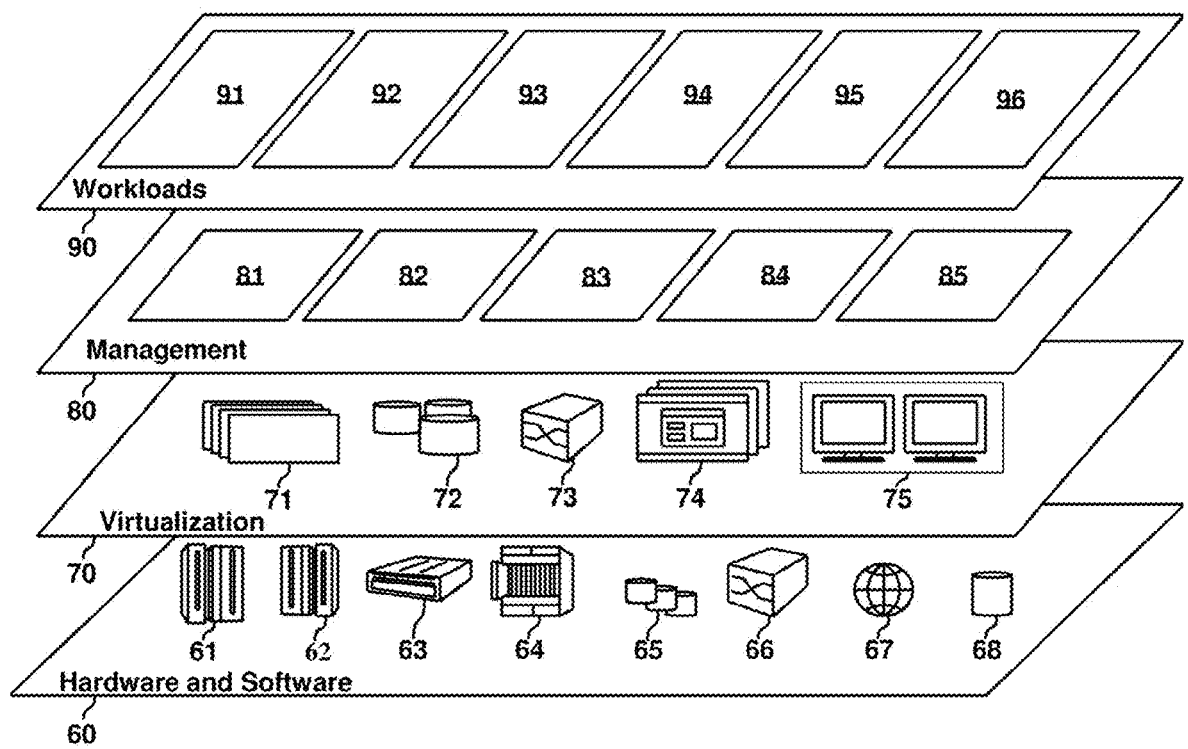
FIG. 2 depicts abstraction model layers of a cloud computing environment according to an embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and a dynamic timeout value determination 96. It is noted that the dynamic timeout value determination 96 can take place as part of the management layer 80 associated with the service level agreement planning and fulfillment 85.

Figure 3:
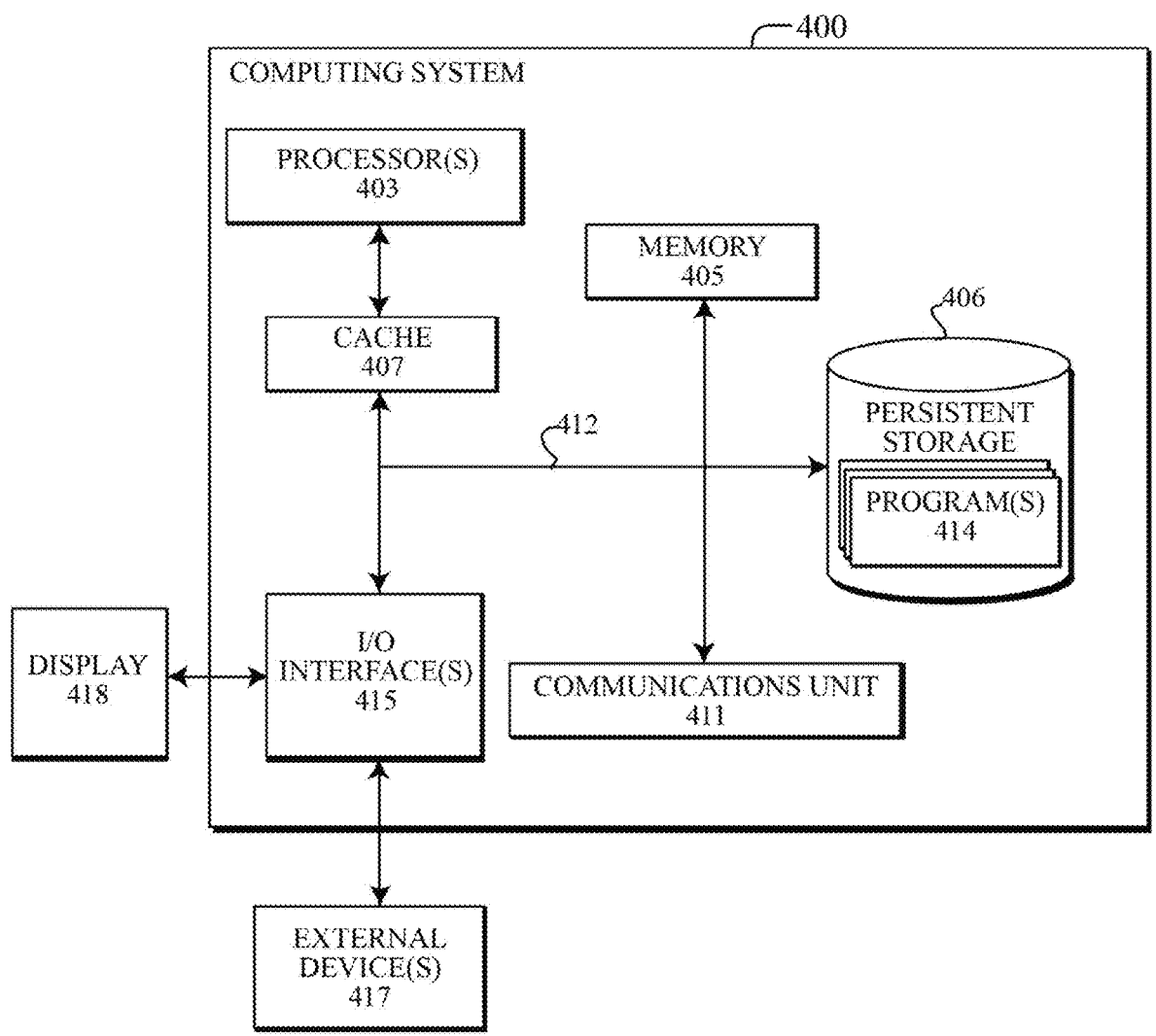
FIG. 3 depicts an embodiment of a block diagram of internal and external components of computing system in which embodiments described herein may be implemented in accordance with the present disclosure.
Figure 4:
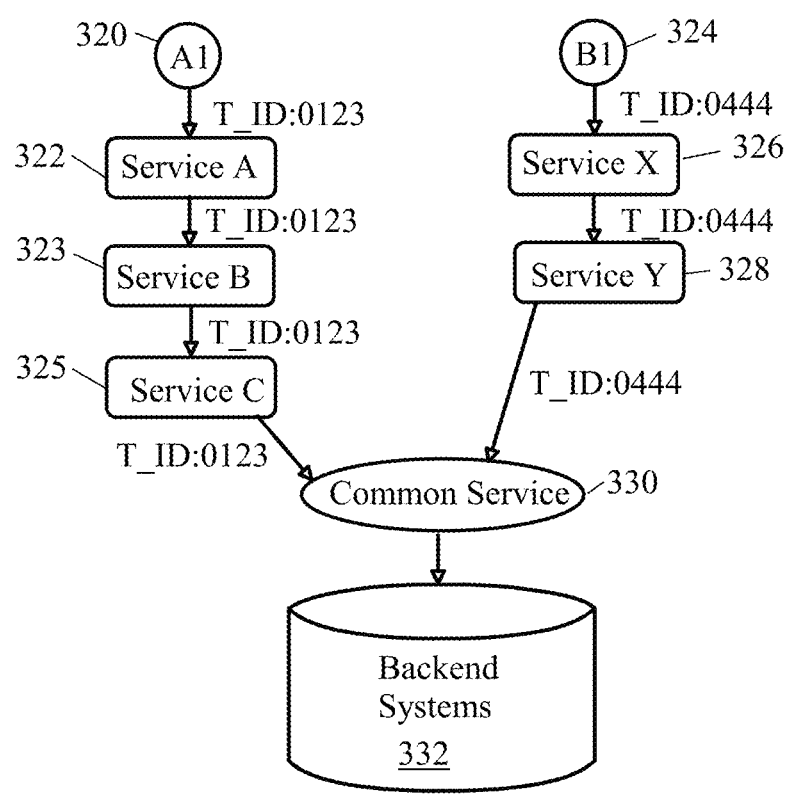
FIG. 4 depicts an example of application services in a microservice architecture.

FIG. 3 illustrates a block diagram of a simplified example of a computing system 400, capable of performing one or more computing operations described herein. Computing system 400 may be representative of the one or more nodes 10 depicted in the cloud computing environment as shown in FIGS. 1-2, and in accordance with the embodiments of the present disclosure described herein. It should be appreciated that FIG. 4 provides only an illustration of one implementation of a computing system 400 and does not imply any limitations with regard to the environments in which different embodiments may be implemented. In general, the components illustrated in FIG. 4 may be representative of any electronic device capable of executing machine-readable program instructions.

While FIG. 3 shows one example of a computing system, a computing system 400 may take many different forms, both real and virtualized. For example, computing systems can take the form of personal desktop computer systems, laptops, notebooks, tablets, servers, client devices, network devices, network terminals, thin clients, thick clients, kiosks, mobile communication devices (e.g., smartphones), augmented reality (AR) devices, virtual reality (VR) headsets, multiprocessor systems, microprocessor-based systems, minicomputer systems, mainframe computer systems, smart devices (i.e. smart glasses, smartwatches, etc.), or Internet-of-Things (IoT) devices and sensors. The computing systems can operate in a networked computing environment, containerized computing environment, a distributed cloud computing environment, a serverless computing environment, and/or a combination of environments thereof, which can include any of the systems or devices described herein and/or additional computing devices or systems known or used by a person of ordinary skill in the art.

Computing system 400 may include communications fabric 412, which can provide for electronic communications between one or more processor(s) 403, memory 405, persistent storage 406, cache 407, communications unit 411, and one or more input/output (I/O) interface(s) 415. Communications fabric 412 can be implemented with any architecture designed for passing data and/or controlling information between processor(s) 403, memory 405, cache 407, external devices 417, and any other hardware components within a computing system 400. Exemplary embodiments of the communications fabric 412 can be implemented as one or more buses.

Memory 405 and persistent storage 406 may be computer-readable storage media. Embodiments of memory 405 may include random access memory (RAM) and cache 407 memory. In general, memory 405 can include any suitable volatile or non-volatile computer-readable storage media and may comprise firmware or other software programmed into the memory 405. Software program(s) 414, applications, and services described herein may be stored in memory 405, cache 407 and/or persistent storage 406 for execution and/or access by one or more of the respective processor(s) 403 of the data processing system 400.

Persistent storage 406 may include a plurality of magnetic hard disk drives. Alternatively, or in addition to magnetic hard disk drives, persistent storage 406 can include one or more solid-state hard drives, semiconductor storage devices, read-only memories (ROM), erasable programmable read-only memories (EPROM), flash memories, or any other computer-readable storage media that is capable of storing program instructions or digital information. Embodiments of the media used by persistent storage 406 can also be removable. For example, a removable hard drive can be used for persistent storage 406. Other examples include optical and magnetic disks, thumb drives, and smart cards that are inserted into a drive for transfer onto another computer-readable storage medium that is also part of persistent storage 406.

Communications unit 411 provides for the facilitation of electronic communications between computing systems 400. For example, between one or more nodes or end-user devices of a cloud network. In the exemplary embodiment, communications unit 411 may include network adapters or interfaces such as a Transmission Control Protocol/Internet Protocol (TCP/IP) adapter cards, wireless Wi-Fi interface cards or antenna, 3G, 4G, or 5G cellular network interface cards or other wired and/or wireless communication links. Communication networks can comprise, for example, copper wires, optical fibers, wireless transmission, routers, firewalls, switches, gateway computers, edge servers and/or other network hardware and virtualized components thereof, which may be part of, or connect to, nodes of the communication networks' devices, systems, hosts, terminals or other network computer systems. Software and data used to practice embodiments of the present invention can be downloaded to the computer systems 400 operating in a network environment through communications unit 411 (e.g., via the Internet, a local area network or other wide area networks). From communications unit 411, the software and the data of program(s) 414, applications or services can be loaded into persistent storage 406 or stored within memory 405 and/or cache 407.

One or more input/output (I/O) interfaces 415 may allow for input and output of data with other devices that may be connected to the data processing system 400. For example, I/O interface 415 can provide a connection to one or more external devices 417 such as one or more, Internet of Things (IoT) devices or sensors, recording devices such as an audio recording devices, microphones, cameras, input devices such as a keyboard, computer mouse, touch screen, virtual keyboard, touchpad, pointing device, or other human interface devices. External devices 417 can also include portable computer-readable storage media such as, for example, thumb drives, portable optical or magnetic disks, and memory cards. I/O interface 415 may connect to human-readable display device 418. The human-readable display device 418 provides a mechanism to display data to a user and can be, for example, a computer monitor, screen, television, projector, display panel, etc. Display devices 418 can also be an incorporated display and may function as a touch screen as part of a built-in display of a tablet computer or mobile computing device.

It is quite common to have different SLAs for service response times for different channel applications within a cloud environment. In an embodiment of the present invention, the channel application is a mobile app, browser based front-end application or another consumer service. The channel application can be any user interaction-based source. For example a bank may provide applications suitable for mobile devices as well as for desktop computers. A user can use either the mobile banking application or the web browser on a desktop to obtain their account balance, through different channels or modes for running the same application to interact with the bank.

The SLA designating response time for a mobile application may be different than the SLA designated response time for a web based application for the same service. The channel applications are in communication with a downstream common service. A common service is a service that is ancillary to the provision of one or more of entry services, exit services and network use of system services that ensures the reliability of a network or otherwise provides benefits to users of the network. The common service is in communication with a backend system. The common service can be configured to be able to react accordingly depending on where the request has come from. Therefore, each application and service has its own timeout value defined and a mechanism to set the timeout values. Errors occur due to varying timeout values based expectations from different services.

For example, a first application can have a SLA timeout value of 3 seconds and makes a call to a common service which has a timeout value of 10 seconds. The first application will return a timeout error if the common service does not respond within 3 seconds. However, in an asynchronous communication design, the common service may still be processing the request and may complete the task in 4 seconds. In such a situation, the task itself has completed, but the result of a timeout error returned by the first application is incorrect. The first application may end up retrying the operation which in fact has been completed successfully.

In another example, a second application has a SLA timeout of 12 seconds and makes a call to a common service (e.g. the same common service discussed above) which has a timeout value of 10 seconds. If the common service is busy and is unable to complete the operation within 10 seconds, the common service will return a timeout error to the second application. However, the second application still has 2 more seconds that could have been used and waited for and it is possible that common service may have managed to finish the operation in 11 seconds, making the whole transaction successful.

In an embodiment of the present invention, the timeout values for applications are set based on a determined service invocation hierarchy and dependencies. A transaction monitoring service considers various factors for timeout value calculation using a moving average model and setting the right timeout value for various services. A range of timeout values for a service can be implemented so that a common service can react according to a calling application's timeout value. The range of timeout values are implemented by propagating the timeout value in the request header or part of the message body of a request by the calling application.

In another embodiment, the common service has an agent to decipher the range of timeout values via a lookup table with a range of timeout values corresponding to the calling application and its associated microservices of the calling application. The common service then makes connections with appropriate timeout value to the backend system, such as a database or a systems applications products (SAP) system.

Figure 7:
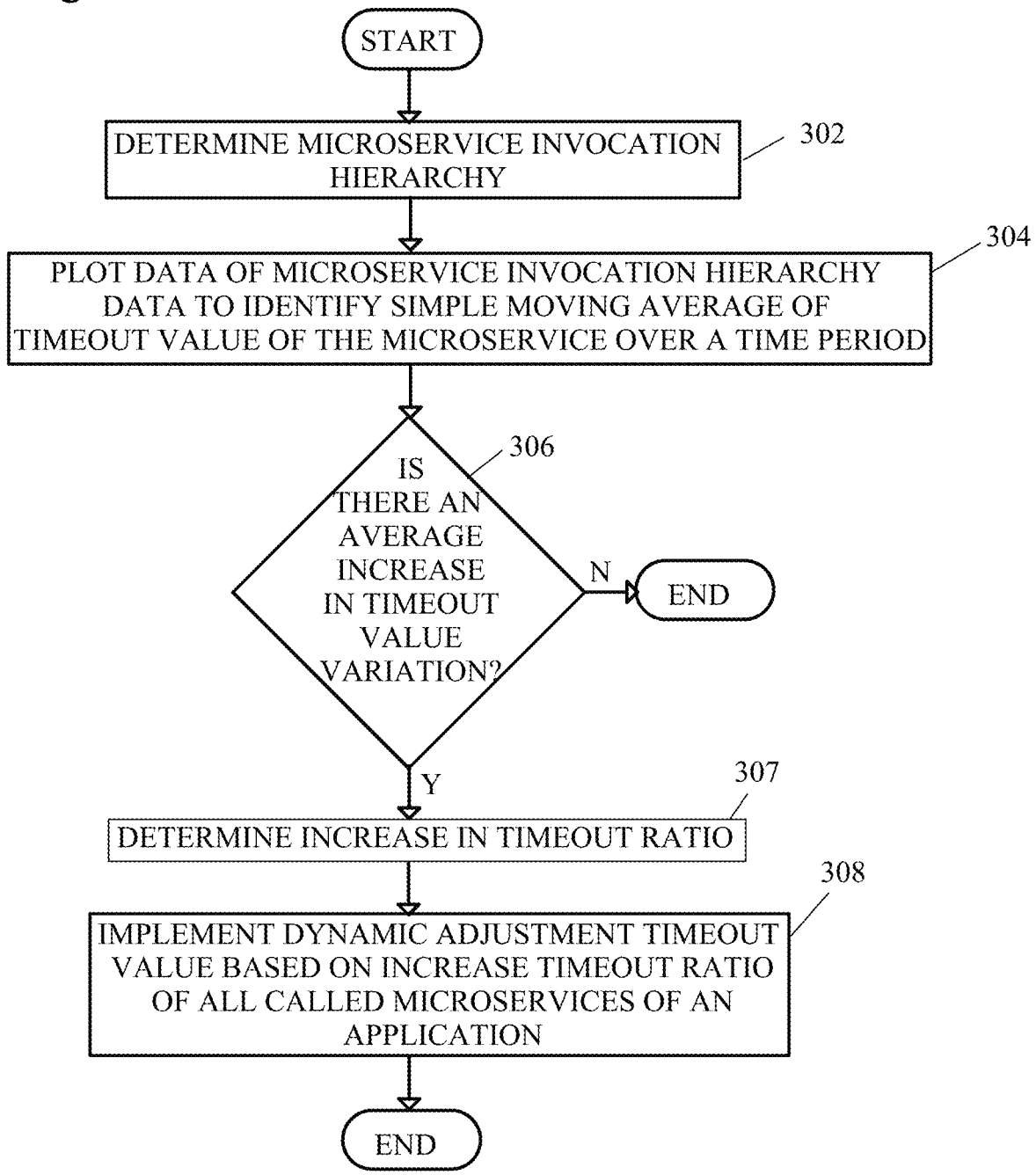
FIG. 7 shows a flow diagram of a method of determining a timeout value of an application service in a microservice architecture.

FIG. 7 depicts a flow diagram of a method of determining a timeout value of an application service in a microservice architecture.

In a first step, a microservice invocation hierarchy is determined (step 302).

In one embodiment, the microservice invocation hierarchy or service topology is determined by tracking transaction identification (T_ID). For a complete transaction from start to finish of an application, the T_ID remains constant. With the T_ID remaining constant for each application, all of the services present within an application's hierarchy can be determined based on the time and sequence in which they execute transactions.

Table 1 shows transaction IDs for services of each of the application.

TABLE 1

| TimeStamp | T_ID | Microservice |
|---|---|---|
| 13:01:00 | 0123(A1) | Service A |
| 13:03:45 | 0123(A1) | Service B |
| 13:03:46 | 0123(A1) | Service C |
| 13:05:01 | 0123(A1) | Common Service |
| 13:01:03 | 0444(B1) | Service X |
| 13:02:35 | 0444(B1) | Service Y |
| 13:04:07 | 0444(B1) | Common Service |
| ... | ... | ... |

From Table 1, a hierarchy of application A1 would be Service A to Service B to Service C and to the Common Service. The hierarchy associated with application B1 would be Service X to Service Y and to the Common Service.

A visual example of the hierarchy is shown in FIG. 4. Application A1 320 includes Service A 322, Service B 323, and Service C 325 which report to a common service 330. Application B1 324 includes Service X 326 and Service Y 328 which report to the common service 330. All of the services 322, 323, 325 of application A1 320 use the same transaction identifier, T_ID:0123. All of the services 326, 328 of the application B1 324 use the same transaction identifier T_ID:0444. The specifics of which services are called in sequence between the first service and the common service is determined by timestamp. The common service 330 is in communication with a repository 332 of backend systems and services.

Alternatively, the service topology or service hierarchy is determined by reviewing or mining an application design document associated with the services.

In another embodiment, the service topology or service hierarchy is determined by identifying any unique identity that is present across multiple services that comprise the entire transaction. An example of a unique identity is an identification (ID) that is assigned to the transaction data or any custom identity built to represent uniqueness of a transaction. For example, appending the current timestamp to the user id so that user x that initiated the transaction at time y can be identified through identity x_y. The unique ID is generated by the calling service which gets passed downstream. The unique ID is an application specific logic comprising parameters which make a transaction unique.

Next, data of the microservice invocation hierarchy is plotted to identify a simple moving average of timeout values of the microservice over a time period (step 304).

Based on the determined hierarchy of FIG. 4, an example of overall transaction time of application A1 is shown in Table 2. The timeout value for application A1 is set to 8 seconds. Ten transactions are shown in Table 2, with the seconds required by each service for a transaction to complete. The total transaction time of the application A1 varies for each individual transaction. The moving average for each transaction of application A1 is calculated. The moving average analyzes data points by creating a series of averages of different subsets of the full data set. While only two applications are shown, multiple applications are present.

TABLE 2

| (Application | Transaction Number | | | | | | | | | |
|---|---|---|---|---|---|---|---|---|---|---|
| A1) | 1 | 2 | 3 | 4 | 5 | 6 | 7 | 8 | 9 | 10 |
| Service A | 2 | 2 | 2 | 1 | 1 | 1 | 1 | 2 | 2 | 2 |
| Service B | 1 | 1 | 1 | 2 | 1 | 1 | 1 | 1 | 2 | 3 |
| Service C | 2 | 2 | 2 | 2 | 2 | 2 | 1 | 2 | 2 | 2 |
| Common Service | 3 | 2 | 3 | 4 | 4 | 3 | 4 | 4 | 4 | 4 |
| Total Transaction Time | 8 | 7 | 8 | 9 | 8 | 7 | 7 | 9 | 10 | 11 |
| Moving Average | | | 7.7 | 8.0 | 8.3 | 8.0 | 7.3 | 7.7 | 8.7 | 10 |
| Application A1 set timeout | 8 | 8 | 8 | 8 | 8 | 8 | 8 | 8 | 8 | 8 |

Figure 6:
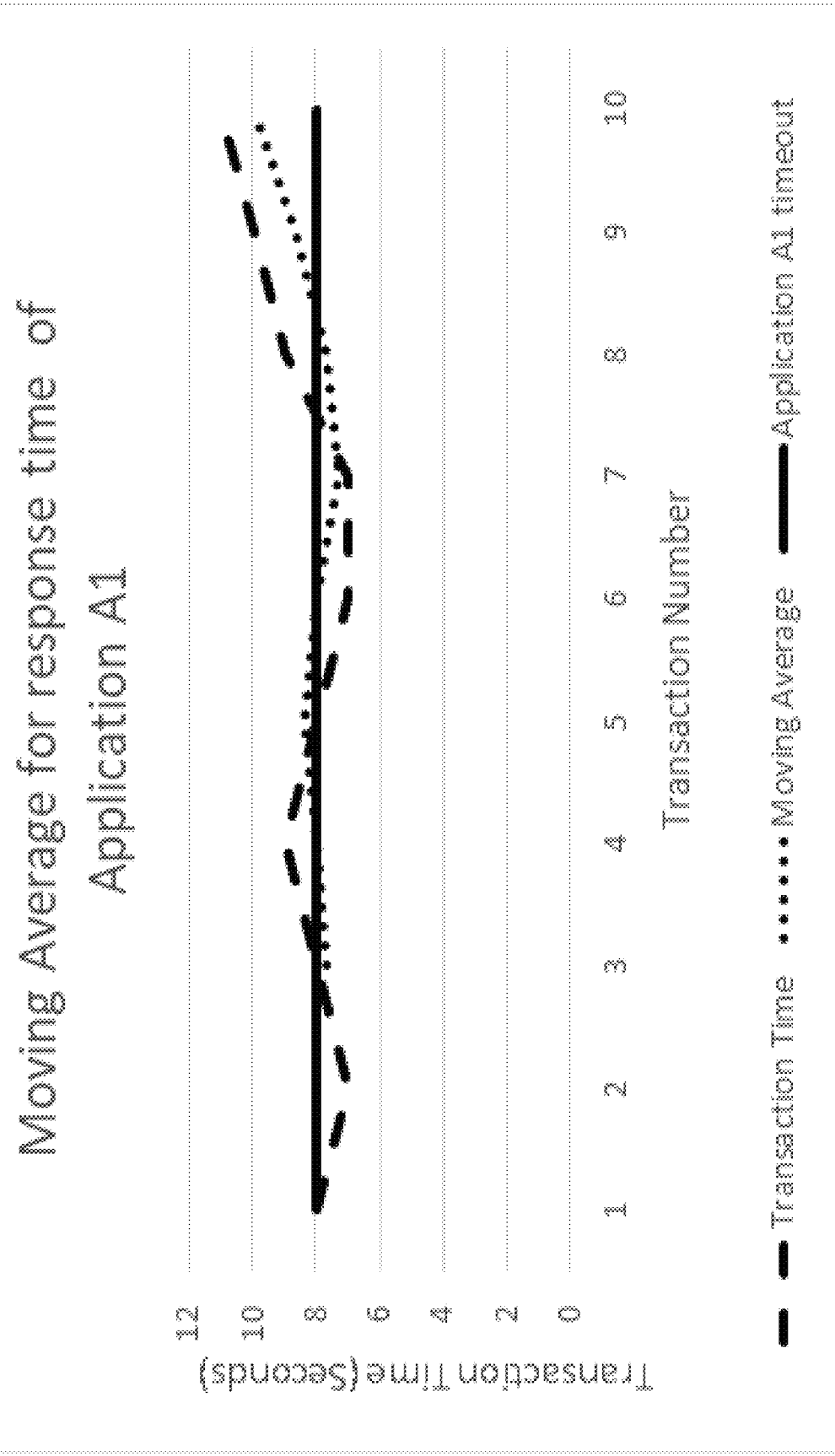
FIG. 6 shows a graph of moving average for response time of an application with transaction time.

FIG. 6 shows a graph of transaction number versus transaction time in seconds with the moving average for response time of application A1. The set timeout value of application A1 is shown by a solid line. The moving average is shown as dotted line and the transaction time is shown as a dashed line. In this example, the set timeout value of application A1 is not proving to be sufficient as the moving average line trends above the initial timeout value of 8 seconds.

If an average trend increase in the timeout variation is not present in the transaction data of the microservice invocation hierarchy (step 306), the method ends. It is noted that if the moving average graph shows a declining trend, the timeout values are not reduced.

If an average trend increase in the timeout variation is present in transaction data of the microservice invocation hierarchy (step 306), the amount of increase in a timeout ratio is determined (step 307). The timeout ratio is the percentage value of timeout of each service calculated against the overall time taken by the transaction.

Figure 5:
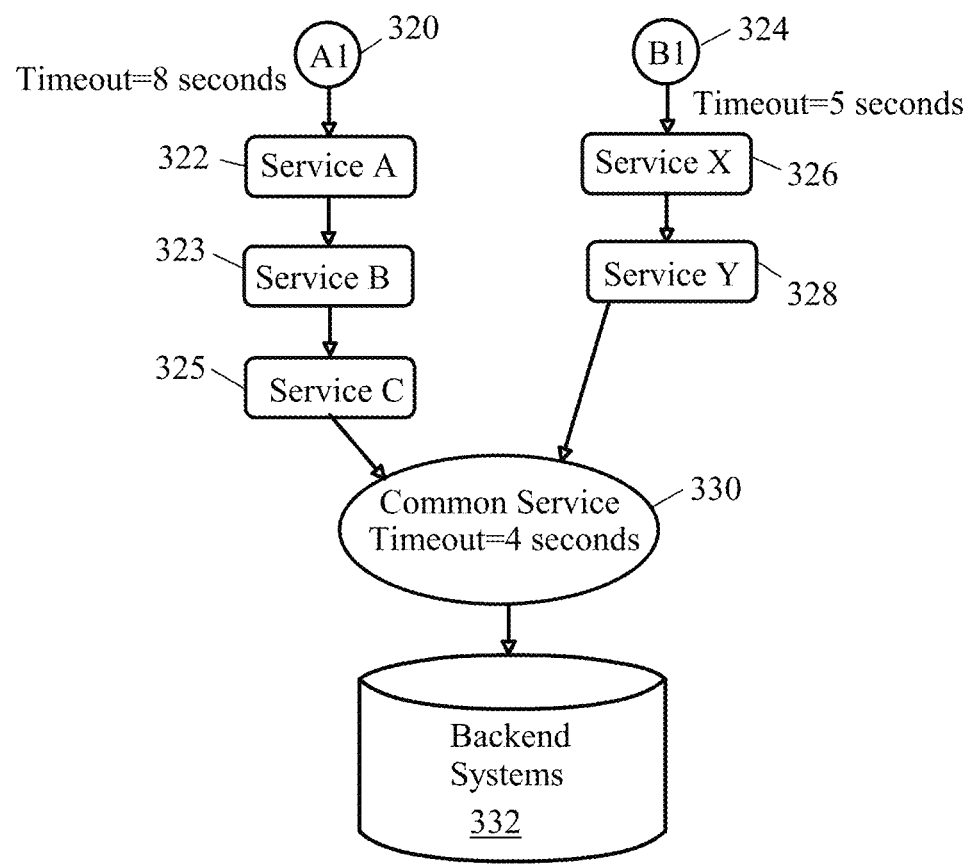
FIG. 5 depicts another example of application services in a microservice architecture.

Referring to FIG. 5, application A1 320, includes Service A 322, Service B 323 and Service C 325 which calls on a common service 330. The timeout value for application A1 is 8 seconds. For application, B1 324, with Service X 326 and Service Y 328 that calls on the common service 330, the timeout value is 5 seconds. The timeout value of the common service 330 is 4 seconds regardless of which application, A1 or B1, calls. The timeout ratio is the overall transaction time of 8 seconds divided by the total transaction time of 15 seconds (8+4+3) multiplied by 100, e.g. 8/15*100. Therefore, the timeout ratio based on the timeout values in FIG. 5 is 53.3%.

The timeout ratio need not be limited to just between the application A1 320 or application B1 324 and the common service 330, but could also be applied to the transaction times between microservices, for example between service A 322 and service B 323, between Service B 323 and Service C 325, and between Service X 326 and service Y 328.

In some cases, applications have a timeout value that is longer than the timeout value of the common service. If the common service had knowledge of the invoking application's timeout value, then if the common service does not finish the operation within the common service's set timeout value, the wait time of the common service for the operation to finish can be extended.

For example, with application A1 320 having a timeout value of 8 seconds, 4 seconds of buffer over the common service's 330 4 second timeout value, a portion of or all of the 4 second buffer can be used by the common service 330 to wait for application A1 320 to finish without violating the SLA between the common service 330 and application A1 320.

The amount of grace time utilized by the common service to return a response of either a success or failure, can by dynamically determined based on the application calling on the common service. It should be noted that the grace time utilized by the common service is preferably within the a range of the original timeout value associated with each application.

The amount of increase of the timeout value or range of timeout values to be adopted by the common service is determined for each calling application using known timeout value amounts in Equation (1.1):

If (App−CS)≥CS then, CSTimeoutRange=$Y$(App−CS)  (1.1)

Where:
App=Overall Application Timeout Value
CS=Common Service Timeout Value
Y=weighted factor The range of timeout values to be implemented by the common service can be determined using Equation (1.1) to be as follows with a weighted factor of 25%:

(8−4)≥4

CSTimeoutRange=0.25(8−4)=1

Therefore, for application A1 320, the common service 330 timeout value range is increased by 1, to be between 4-5 seconds for services calling from application A1 320. The range for application B1 would not be increased, since the application timeout value of the difference between the timeout value of application B1 324 of 5 seconds and the timeout value of the common service 330 timeout value of 4 seconds is not greater than or equal to the common service 330 timeout value of 4 seconds. The common service 330 therefore executes a dynamic range adjustment depending on which application, A1 320, or B1 324 calls on the common service 330.

While 25% was chosen as the weighted factor, other factors can also be used, such as less than 25% or greater than 25%.

In another embodiment, Equation (1.2) can be used to determine the range adjustment of the timeout value of the common service.

$Y$(App1−CS)=TimeoutRangeIncreaseApp1

$Y$(App $n$−CS)=TimeoutRangeIncreaseAppn  (1.2)

Where:
App=Overall Application Timeout Value for a designated application
CS=Common Service Timeout Value
Y=Weighted Factor Based on the example given in FIG. 5, and with the weighted factor Y being equal to 10 percent.

0.1(8−4)=0.4 seconds Timeout Range Increase for Application A1

0.1(5−4)=0.1 second Timeout Range Increase for Application B1

Therefore, the timeout value range for the common service when application A1 calls is 4.0-4.4 seconds and the timeout value range for the common service when application B1 calls is 4.0-4.1 seconds.

A dynamic adjustment of the timeout value of the common service is implemented based on the increase timeout ration of all called microservices of an application (step 308) and the method ends.

By dynamically adjusting the timeout value based on the determined increase in timeout ratio, the timeout value for call microservices and application of the microservice invocation hierarchy is increased as necessary to decrease erroneous timeouts and decrease overall resource usage from unnecessary repeat executions.

As discussed above, the dynamic adjustment of the timeout value of the common service for each application can be implemented based on propagating the timeout value in the request header or part of the message body of a request by the calling application or alternatively, the range of timeout values can be stored within the common service and determined using a lookup table.

In an alternate embodiment, the moving average can be graphed for transaction time between each microservice of a microservice invocation hierarchy. For example, the transaction time present between service A and service B, between service B and service C, etc. . . . . Then a timeout value adjustment can be determined for time between microservices. The value of the timeout value can be adjusted based on the highest moving average value and factoring the highest moving average value with X, with X being a configurable entity or weighted factor. For example, for the highest success rates, X can be set to a higher value than the moving average, for example 1.5X or 0.9X for a success rate of 90%.

Table 3 shows the moving average for transaction time between each microservice.

TABLE 3

| (Application | Transaction Number | | | | | | | | | |
|---|---|---|---|---|---|---|---|---|---|---|
| B1) | 1 | 2 | 3 | 4 | 5 | 6 | 7 | 8 | 9 | 10 |
| Service X | 5 | 4 | 3 | 4 | 5 | 4 | 5 | 5 | 3 | 4 |
| Service Y | 8 | 6 | 5 | 8 | 7 | 6 | 7 | 9 | 8 | 6 |
| Common Service | 3 | 3 | 4 | 5 | 5 | 4 | 4 | 5 | 5 | 4 |
| Total Transaction Time | 16 | 13 | 12 | 17 | 17 | 14 | 16 | 19 | 16 | 14 |
| Transaction Time of Service Y | 8 | 6 | 5 | 8 | 7 | 6 | 7 | 9 | 8 | 6 |
| Moving Average | | | 6.3 | 6.3 | 6.7 | 7.0 | 6.7 | 7.3 | 8.0 | 7.7 |
| Service X timeout | 7 | 7 | 7 | 7 | 7 | 7 | 7 | 7 | 7 | 7 |

Figure 8:
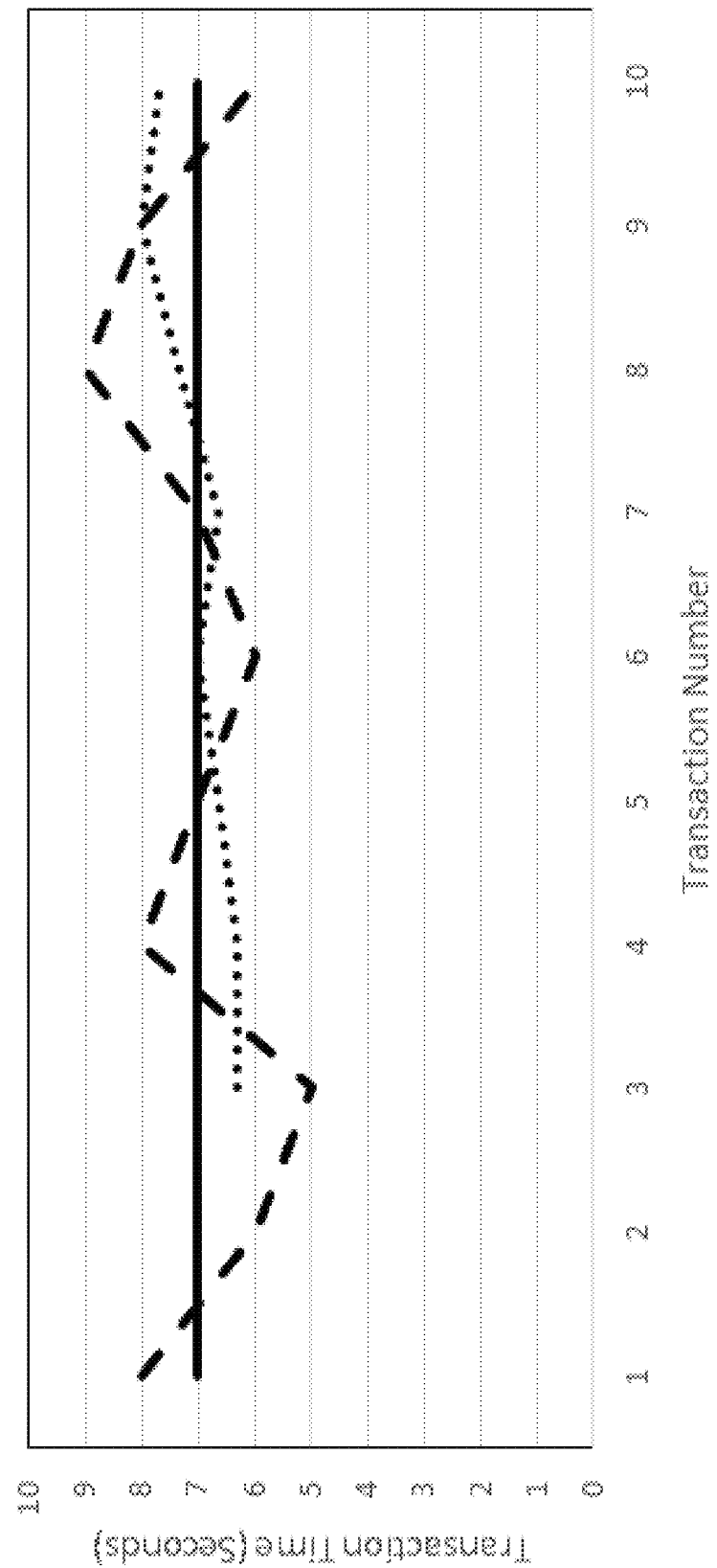
FIG. 8 shows a graph of moving average for response time of another application.

FIG. 8 shows a graph of moving average for response time of another application B1. The service X timeout was initially set to 7 seconds. Given the moving average, of three transaction taken cumulatively, of Service Y response time of the last ten transactions shows that the highest moving average is 8 seconds. Therefore, for 100% success rate of Service X, the timeout of Service X should be set to at least 8 seconds. The multiplying factor would 1.2, such that 1.2*7=8.4 seconds, which is greater than 8 seconds.

The dynamic timeout values may be applied in at least some of the following examples.

In a first example, the dynamic timeout values can be applied to alter the timeout value both upstream and downstream within the hierarchy. Therefore, in an example as shown in FIG. 4, a dynamic timeout value is applicable downstream, with first application A1 320 calling on Service A 322, Service B 323, and Service C 325 and then the common service 330, with the common service 330 increasing the timeout value to allow the services 322, 323, 325 of application A1 320 to complete prior to reporting a success or failure. The dynamic timeout value is applicable upstream, with the common service 330 providing information to Service C 325, Service B 323, Service A 322 and application A1 320.

In a second example, the dynamic timeout values are used to add a grace period or grace time. When an application has a shorter or longer timeout value than downstream microservices, a grace timeout period can be added when a calling service or common service is commonly waiting for a response from the application. Referring to FIG. 5, as shown the common service 330 has a timeout value of 4 seconds, where application B1 324 can wait up to 5 seconds. In such a case, a 1 second grace period is added a grace period to increase the number of successful transactions between application B1 324 and the common service 330 without having to have the timeout value of common service 330 match the maximum timeout of all services involved or calling on a same common service 330.

In a third example, a retry mechanism is optimized if the retry loop fails due to a timeout failures. If an application has a timeout value of 3 seconds, whereas latter microservices calls downstream may take more time, the timeout value can be dynamically adjusted by later microservices to stop processing and discontinue the retry mechanism, for microservices which do not match the timeout value of the calling service.

In a fourth example, relative timeouts can used instead of setting a timeout to a value of an overall interaction. This is an example of an upstream timeout setting, where a few transactions are run to identify the appropriate value for the timeout of calling service. An application that has four services which are used in sequence from Service A through Service D, with each of the services having different timeout values. If Service A has a timeout value of 4 seconds, Service B has a timeout value of 2 seconds, Service C has a timeout value of 5 seconds, and Service D has a timeout value of 3 seconds, for a sequential call, the timeout value has to be set so that the response of the called service is within the time period expected by the calling service. Therefore, in this instance, the relative timeout would be set to 5 seconds for each sequential service by the common service.

It should be noted that examples given above are situations in which the embodiments of the method are implemented. The examples are not meant to be limiting as the only examples in which the method can be implemented.

Embodiments of the present invention provide numerous advantages. Embodiments of the present invention can determine a grace time period for transactions to complete where the caller and the called service having a small delta difference in their timeout values. Embodiments of the present invention determine and optimize of a range of timeout values to allow a common service to react appropriately to more than one invoking service. Embodiments of the present invention dynamically alter the timeout value of a common service based on the timeout value of the calling application and/or service.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method of determining a timeout value of at least one application having a microservice architecture, the method comprising steps of:
determining a microservice invocation hierarchy based on transaction data of a plurality of microservices of the microservice architecture, for execution of the at least one application, the microservice architecture configured to call on a common service having a common service timeout value;
plotting the transaction data of the microservice invocation hierarchy to identify an increase in an average timeout value trend of each of the microservices of the at least one application over time, wherein the average timeout value trend of each microservice is determined by calculating a simple moving average of each transaction of the plurality microservices of the at least one application;
for each identified increase in the average timeout value trend in which an increase in timeout variation is present, determining a value of the identified increase in a timeout ratio to be added to the common service timeout value; and
implementing a dynamic adjustment timeout value based on the identified increase in the timeout ratio to be added to the common service timeout value of all called microservices of the at least one application.

2. The method of claim 1, wherein the step of determining the microservice invocation hierarchy comprises tracking transaction identification and an associated timestamp for each transaction of the plurality of microservices of the at least one application.

3. The method of claim 1, wherein determining the value of the identified increase in the timeout ratio to be added to the common service timeout value comprises determining a difference between an overall timeout value of the at least one application and the common service timeout value is greater than or equal to the common service timeout value, then determining a product of the difference between the overall timeout value of the at least one application and the common service timeout value by weighted factor.

4. The method of claim 3, wherein the weighted factor is twenty-five percent or less.

5. The method of claim 1, wherein the value of the identified increase in the timeout ratio is a range adjustment, and determining the range adjustment comprises the steps of: determining a difference between an overall timeout value of the at least one application and the common service timeout value, and a product of the difference and a weighted factor to equal the range adjustment and adding the range adjustment to the common service timeout value for the at least one application.

6. The method of claim 1, wherein the transaction data of the microservices comprises an execution of the at least one application is transaction time between microservices of the at least one application.

7. The method of claim 1, wherein the dynamic adjustment timeout value does not violate a service level agreement between the common service and the at least one application.

8. A computer program product for determining a timeout value of at least one application having a microservice architecture comprising at least one processor, one or more memories, one or more computer readable storage media, the computer program product comprising a computer readable storage medium having program instructions embodied therewith, the program instructions executable by the processor to perform a method comprising:
determining, by a common service of the microservice architecture, a microservice invocation hierarchy based on transaction data of the plurality of microservices of the microservice architecture for execution of the at least one application, the microservice architecture configured to call on the common service having a common service timeout value;

plotting, by the common service, the transaction data of the microservice invocation hierarchy to identify an increase in an average timeout value trend of each of the microservices of the at least one application over time, wherein the average timeout value trend of each microservice is determined by calculating a simple moving average of each transaction of the plurality microservices of the at least one application;

for each identified increase in the average timeout value trend in which an increase in timeout variation is present, determining, by the common service, a value of the identified increase in a timeout ratio to be added to the common service timeout value; and implementing, by the common service, a dynamic adjustment timeout value based on the identified increase in the timeout ratio to be added to the common service timeout value of all called microservices of the at least one application.

9. The computer program product of claim 8, wherein the step of determining the microservice invocation hierarchy comprises tracking transaction identification and an associated timestamp for each transaction of the plurality of microservices of the at least one application.

10. The computer program product of claim 9, wherein determining the value of the identified increase in the timeout ratio to be added to the common service timeout value comprises determining a difference between an overall timeout value of the at least one application and the common service timeout value is greater than or equal to the common service timeout value, then determining a product of the difference between the overall timeout value of the at least one application and the common service timeout value by weighted factor.

11. The computer program product of claim 10, wherein the weighted factor is twenty-five percent or less.

12. The computer program product of claim 8, wherein the value of the identified increase in the timeout ratio is a range adjustment, and determining the range adjustment comprises the steps of: determining a difference between an overall timeout value of the at least one application and the common service timeout value, and a product of the difference and a weighted factor to equal the range adjustment and adding the range adjustment to the common service timeout value for the at least one application.

13. The computer program product of claim 8, wherein the transaction data of the microservices comprises an execution of the at least one application is transaction time between microservices of the at least one application.

14. The computer program product of claim 8, wherein the dynamic adjustment timeout value does not violate a service level agreement between the common service and the at least one application.

15. The computer program product of claim 8, wherein the at least one application is executed in a cloud environment.

16. A computer system for determining a timeout value of at least one application having a microservice architecture, the computer system comprising:

at least one processor;

one or more memories; and one or more computer readable storage media having program instructions executable by the computer system to perform the program instructions comprising:

determining, by a common service of the microservice architecture, a microservice invocation hierarchy based on transaction data of the plurality of microservices of the microservice architecture for execution of the at least one application, the microservice architecture configured to call on the common service having a common service timeout value;

plotting, by the common service, the transaction data of the microservice invocation hierarchy to identify an increase in an average timeout value trend of each of the microservices of the at least one application over time, wherein the average timeout value trend of each microservice is determined by calculating a simple moving average of each transaction of the plurality microservices of the at least one application;

for each identified increase in the average timeout value trend in which an increase in timeout variation is present, determining, by the common service, a value of the identified increase in a timeout ratio to be added to the common service timeout value; and implementing, by the common service, a dynamic adjustment timeout value based on the identified increase in the timeout ratio to be added to the common service timeout value of all called microservices of the at least one application.

17. The computer system of claim 16, wherein the program instructions of determining, by the common service, a microservice invocation hierarchy based on transaction data of the plurality of microservices for execution of the at least one application comprises tracking, by the common service, transaction identification and an associated timestamp for each transaction of the plurality of microservices of the at least one application.

* * * * *